(12) United States Patent
Ranck

(10) Patent No.: US 11,039,598 B2
(45) Date of Patent: Jun. 22, 2021

(54) PET WATERING SYSTEM

(71) Applicant: Dennis D. Ranck, Las Vegas, NV (US)

(72) Inventor: Dennis D. Ranck, Las Vegas, NV (US)

(*) Notice: Subject to any disclaimer, the term of this patent is extended or adjusted under 35 U.S.C. 154(b) by 321 days.

(21) Appl. No.: 16/209,957

(22) Filed: Dec. 4, 2018

(65) Prior Publication Data

US 2019/0289819 A1    Sep. 26, 2019

Related U.S. Application Data

(60) Provisional application No. 62/761,447, filed on Mar. 26, 2018.

(51) Int. Cl.
  *A01K 5/01*        (2006.01)
  *A01K 7/02*        (2006.01)

(52) U.S. Cl.
  CPC ............ *A01K 7/025* (2013.01); *A01K 5/0114* (2013.01); *A01K 7/022* (2013.01)

(58) Field of Classification Search
  CPC ........ A01K 5/0114; A01K 7/00; A01K 7/005; A01K 7/02; A01K 7/022; A01K 7/025; A01K 7/027; A01K 7/04; A01K 7/06; A01K 45/002
  USPC ...... 239/16, 17, 20, 21, 24, 28, 29.5; 119/78
  See application file for complete search history.

(56) References Cited

U.S. PATENT DOCUMENTS

| | | | | |
|---|---|---|---|---|
| 151,003 A * | 5/1874 | Briesen | ................ | B05B 17/08 239/22 |
| 439,290 A * | 10/1890 | Clapp | ................ | A01K 39/02 119/74 |
| 648,922 A * | 5/1900 | Chace | ................ | A01K 7/04 119/78 |
| 994,683 A * | 6/1911 | Ljunggren | ........... | A47G 33/02 206/19 |
| 1,042,246 A * | 10/1912 | Markley | ............... | A01K 7/04 119/78 |
| 1,146,946 A * | 7/1915 | Murdock | ............... | E03B 9/20 239/29.5 |
| 1,490,677 A * | 4/1924 | Mueller | ............... | E03B 9/20 239/29.5 |
| 1,525,425 A * | 2/1925 | Mueller | ............... | E03B 9/20 239/29.5 |
| 2,509,004 A * | 5/1950 | Lipman | ............... | A01K 39/02 119/74 |
| 4,888,118 A * | 12/1989 | Barnes | ................. | C02F 1/766 210/668 |
| 5,064,534 A * | 11/1991 | Busch | .................... | C02F 1/42 210/266 |
| 6,013,181 A * | 1/2000 | Thellmann | ........... | B01D 39/04 210/266 |
| 6,484,666 B1 * | 11/2002 | Reusche | ............. | A01K 45/002 119/69.5 |

(Continued)

*Primary Examiner* — Joshua E Rodden

(57) ABSTRACT

A pet watering system having a base portion configured to store water, a float valve configured to cease water flow in the base portion when water reaches a predetermined level, a water bowl segment that is configured to provide access to water for hydration, a faucet implement, wherein the faucet implement directs water to the water bowl segment, a water pump device that is configured to direct water stored in the base portion to the faucet implement, and a bowl bottom lip disposed on a bottom portion of the water bowl segment, wherein the bowl bottom lip is configured to fasten to the base portion.

14 Claims, 5 Drawing Sheets

(56) References Cited

U.S. PATENT DOCUMENTS

| | | | | |
|---|---|---|---|---|
| 6,640,747 B2 * | 11/2003 | Reusche | .............. | A01K 45/002 119/69.5 |
| 6,684,813 B1 * | 2/2004 | Lemon | ................. | A01K 45/002 119/69.5 |
| 2003/0075113 A1 * | 4/2003 | Desatoff | .............. | A01K 45/002 119/69.5 |
| 2007/0235381 A1 * | 10/2007 | Tsai | ........................ | C02F 1/003 210/287 |
| 2009/0277392 A1 * | 11/2009 | Potter | .................. | A01K 45/002 119/69.5 |

* cited by examiner

PET WATERING SYSTEM

CROSS-REFERENCE TO RELATED APPLICATIONS

The present Utility patent application claims priority benefit of the [U.S. provisional application for patent Ser. No. 62/761,447 entitled "Pet Watering System", filed on Mar. 26, 2018 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to pet support systems. More particularly, certain embodiments of the invention relate to a pet watering system.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Pet ownership in the U.S. may be at an all-time high, and may have increased 24 percent over the last 20 years. When it comes to cats, almost 40 percent of all U.S. households may have a feline; that's over 45 million consumers. And for dogs, almost half of all American households—46.6 percent for almost 57 million—may own a canine. Spending on products for these animals may have increased, as well, and at a far faster rate. Total annual spending on pet products in the U.S. may have hit $69.5 billion in 2017, and early estimates predict an additional $2.6 billion in growth this year. This high rate of growth in sales for the industry may be rather common, too, as its sales have more than tripled in the last 20 years. Nearly a quarter of these high sales (21.7 percent) may be attributed to pet supplies. Not food, not veterinarian bills, not grooming fees and not the costs of new pets themselves, but supplies for use by pet owners in the care of their animals. This means that products such as leashes, pet brushes and service dishes for pets may be responsible for about $15.11 billion of these total annual sales. These items may be growing in sales faster than other pet products. For example, sales of pet supplies grew roughly 6.1 percent annually in each of the last three years, while all other items and services for animal owners increased only 3.9 percent.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that water bowls for pets may need refilled with water. The bowl may need cleaning too. Sitting still for a day may result in water leaving a film about the bowl as stagnation begins. Toss in the dust and dirt that may settle in that water, along with the animal's fur, and that bowl-washing experience may be disgusting. Not only would it be inconvenient, but the process may be difficult for some people. About 15 percent of all pet owners may be senior citizens, after all, and whose subjectivity to arthritis and other ailments may make bowl filling and cleaning a difficult task to do with such regularity.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
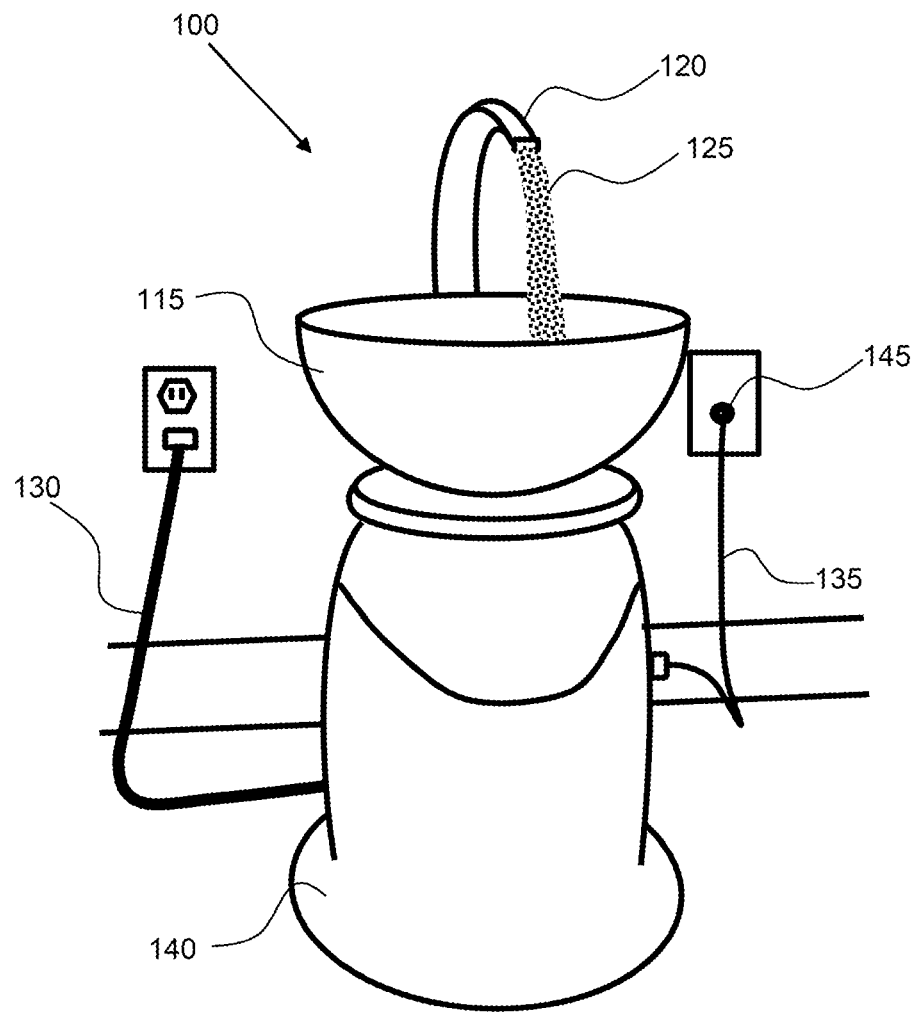
FIG. 1 is an illustration of an exemplary pet watering system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit "about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like.

It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms.

Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to pet support systems. Pets and pet owners may have a lot in common when it comes to liquid refreshment. Just like pet owners, pets may need water not just to quench thirst, but for important health reasons. Making it easy for pets to access water with regularity, then, may be important. It may be inconvenient at times, though, and for animals and their owners. A pet watering system may simplify the process by eliminating the need to refill water bowls and clean them with such regularity. The pet watering system keeps the bowl filled with water that has consistent aeration, which prevents the bowl from developing mold and mildew. The aeration of the water may offer more benefits than just maintenance of cleanliness. It may benefit the wellbeing of the pets, too. Aerated water maintains higher oxygen content which may benefit the health of the pets who drink from it. Making aerated water easier to access may help pets consume more of it. The pet watering system offers water at a raised height, allowing animals to drink from head level instead of having to crane down to access it. In this manner more water may be consumed, instead of having the water consistently drip from the mouth of the pet while it laps it up from a ground-level bowl. Improved water consumption may offer substantial improvement to pet health. Regular water consumption may help prevent urinary tract infections and kidney ailments to which cats and dogs are commonly subject. Proper hydration may also help them maintain proper body temperatures, and may help maintain fat metabolism. Consistent consumption of water may be needed to help animals overcome and heal from common ailments, too.

In one embodiment of the present invention, the Pet Watering System features a base structure that contains a water pump, and this pump transports water to a bowl that rests atop the base. Ports that connect to sources for the water and the power needed to operate the pump are also featured in the base. The bowl features a raised drain, which may allow an adequate volume of water to stay within the bowl for its consumption but while returning excess water to the base for continued circulation. A float valve within the base may control water flow from the source, and may allow water to automatically be added as needed. The raised height of the serving bowl may make the water easier for animals to access. No bending or stooping may be needed, as the animals may drink the water from a standing head height. Making the water easier to access may not only be a convenience to its using pets, but the Pet Watering System may also be a benefit to their health, too. The Pet Watering System may encourage more regular consumption, and in higher volumes per use. The improved fluid consumption ensures needed hydration for the animals, which may help protect from ailments common to both dogs and cats. The regular circulation of the water may also improve the oxygen content. Unlike standard water bowls, the Pet Watering System doesn't need daily refills and daily cleanings. Due to the fact that animals may consume higher quantities of the water and without the normal splashes and spills, pet owners don't have to clean up spilled water from the surrounding area.

The present invention will now be described in detail with reference to embodiments thereof as illustrated in the accompanying drawings.

FIG. 1 is an illustration of an exemplary pet watering system 100, in accordance with an embodiment of the present invention. In the present embodiment shown, the pet watering system 100 comprises a water bowl segment 115, a faucet implement 120, a base portion 140, a water line 135 connecting a water source 145 to the base portion 140, and a power cord 130. The water bowl segment 115 is configured to hold water for a pet to drink. For demonstration purposes, flowing water 125 is shown being dispensed out of the faucet implement 120 to fill up the water bowl segment 115. The base portion 140 may be made of high-density polyethylene (HDPE), and in a cylindrical shape of an approximate fifteen-inch height by ten-inch diameter (15"×10"). The water bowl segment 115 may be made of high-density polyethylene (HDPE) and of an approximate six-inch height by twelve-inch diameter (6"×12"), which securely attaches upon the top of the base portion 140. The water source 145 is directly connected to the base portion 140 through the water line 135 to ensure a steady and constant source of water.

Figure 2:
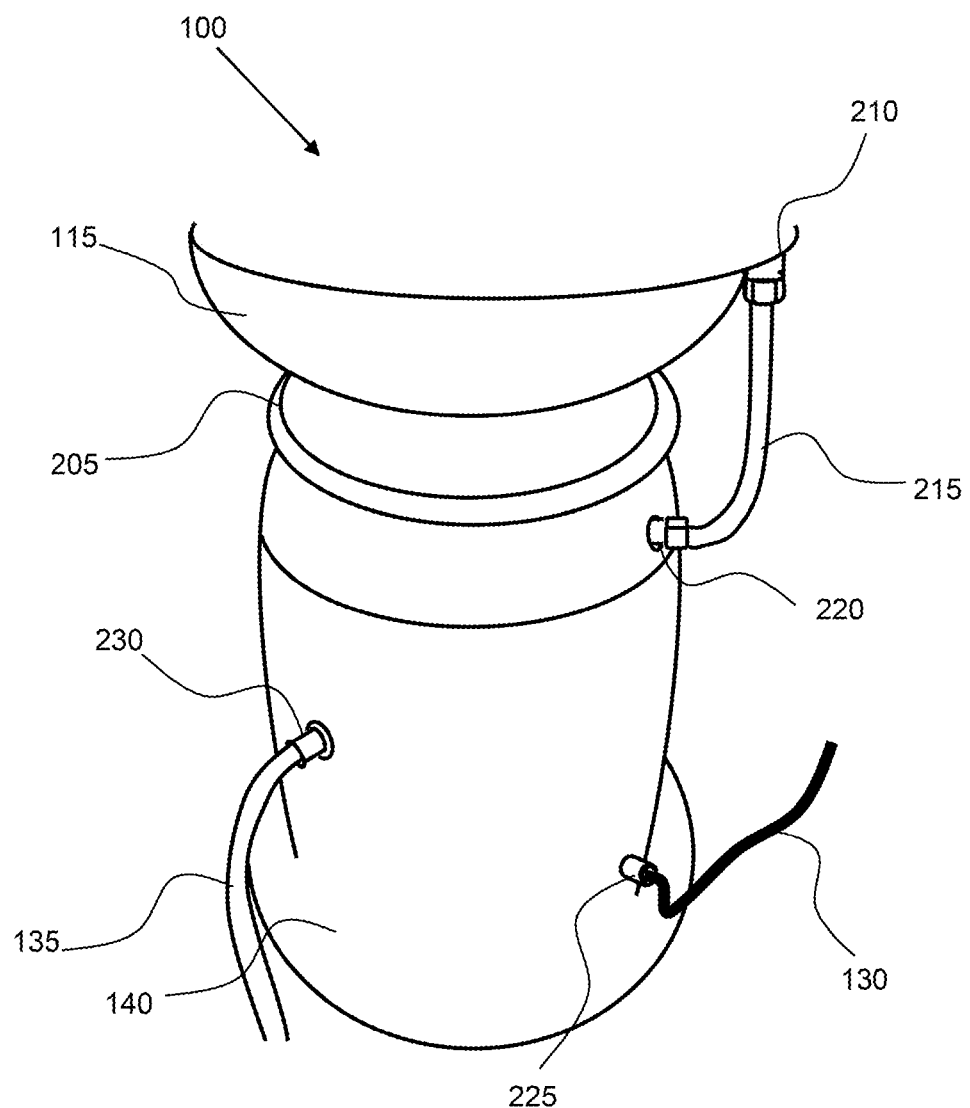
FIG. 2 is an illustration of an exemplary base, in accordance with an embodiment of the present invention.

FIG. 2 is an expanded view of the pet watering system 100, in accordance with an embodiment of the present invention. In the present embodiment shown, a water bowl segment 115 includes a bowl bottom lip 205 that is configured to fasten to the base portion 140 and an external water flow tube connection 210 that is configured to engage the faucet implement 120 (not shown in this figure). A water line (first) connection port 230 is disposed on a first segment of the sidewall of the base portion 140 to engage the water line 135 connecting the water source 145 to the base portion 140. An external water flow tube 215 is configured to transfer water from the base portion 140 to the faucet implement 120. A second connection port 220 is disposed on a second segment of the sidewall for engaging the external water flow tube 215. The water line connection port 230 in the first segment of the base sidewall may allow access to a water source. An electrical port 225 disposed on a third segment of the base sidewall allows access to the power cord 130, which couples to a water pump featured within the base portion 140.

Figure 3:
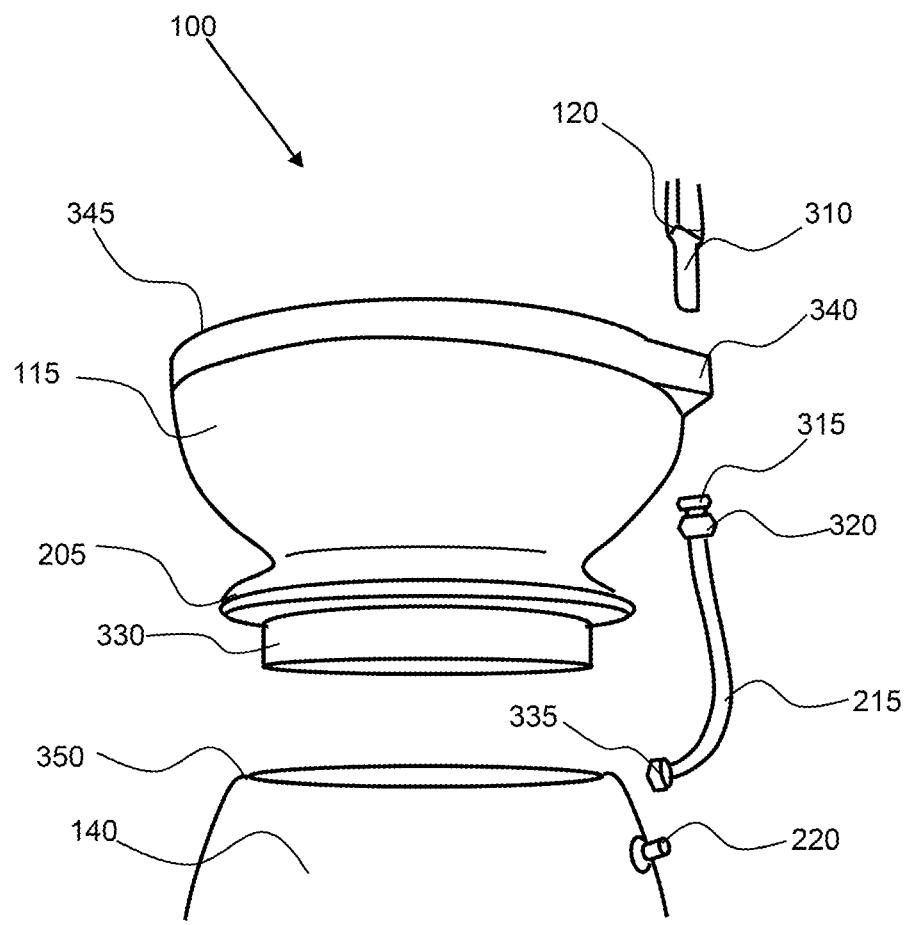
FIG. 3 is an illustration of an exemplary water bowl and base, in accordance with an embodiment of the present invention.

FIG. 3 is an illustration of an exemplary water bowl segment 115 and base portion 140, in accordance with an embodiment of the present invention. In the present embodiment shown, the water bowl segment 115 comprises a bowl bottom lip 205 that is configured to fasten to a rim 350 of the base portion 140, a stabilization flange 330 which inserts into the rim 350 of the base portion 140, a bowl rim lining 345, and a faucet holder 340. The combination of the bowl base lip 205 and stabilization flange 330 may secure and stabilize the water bowl segment 115 to the base portion 140. In addition, the arrangement may allow access to the interior of said base when needed and at the same token, prevent the water bowl segment 115 from being accidently knocked from the base portion 140. The faucet implement 120 includes a threaded connection point 310 that is configured to connect to the external water flow tube 215. The external water flow tube 215 comprises a threaded washer 315, a first threaded fastener 310 that is configured to connect to the threaded connection point 320 of the faucet implement 120, and a second threaded fastener 335 that is configured to engage the connection port 220 of the base portion 140. The bowl rim lining 345 is configured to protect the upper lip perimeter of the water bowl segment 115 at the same token provides support to the faucet holder 340.

Figure 4:
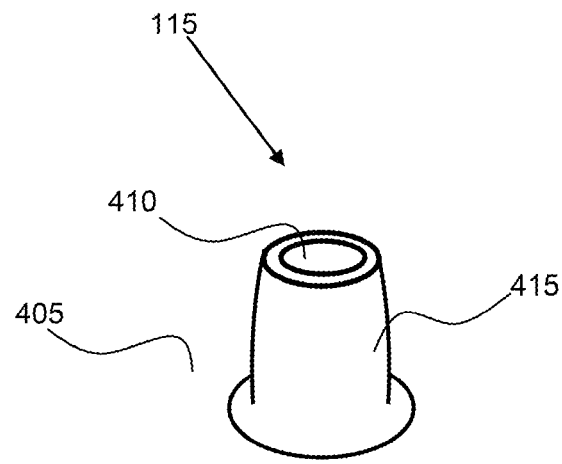
FIG. 4 is an illustration of an exemplary top view of the water bowl, in accordance with an embodiment of the present invention.

FIG. 4 is an illustration of an exemplary top view of the water bowl segment 115, in accordance with an embodiment of the present invention. In the present embodiment shown, the water bowl segment 115 includes a water bowl 405, a raised drain valve 415 within a center of the water bowl 405, and an aperture 410. The raised drain valve 415 may include an approximate two-inch (2") height and the aperture 410 to allow water drainage back into the base portion 140. The aperture 410 ensures water may flow out of the water bowl. The raised drain valve 405 may ensure water remains in the bowl for pet access should water flow be temporarily disrupted, without the pet having to bend, stoop or lower their neck.

Figure 5:
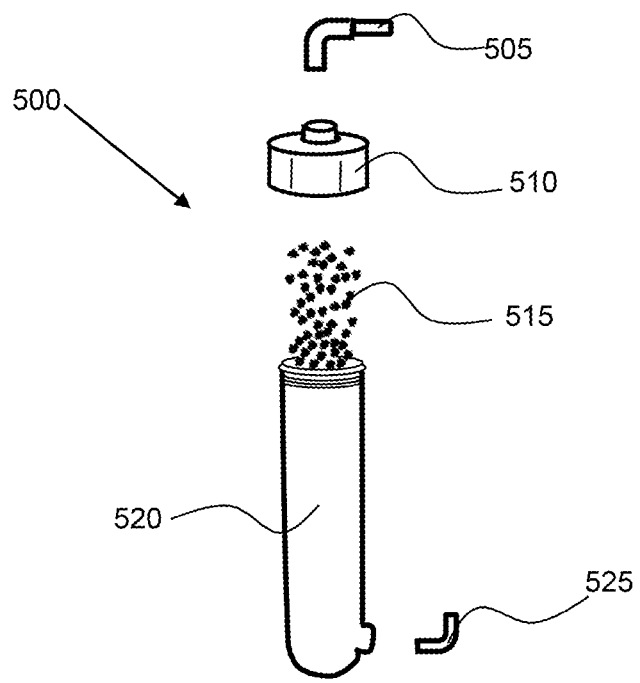
FIG. 5 is an illustration of an exemplary water filter, in accordance with an embodiment of the present invention.

FIG. 5 illustrates an expanded views of an exemplary water filter implement 500, in accordance with an embodiment of the present invention. In the present embodiment shown, the water filter implement 500 includes a first water tube connection point 505, a cap 510, a charcoal based filtration medium 515, a second water tube connection point 525, and a filter body 520. The water filter implement 500 is configured to filter water from said water source that is stored in said base portion and ensure clean water for pet hydration. In one embodiment, the filter body 520 may include, but not limited to, a cylindrical shape body. In alternative embodiments, the filter body 520 may be round, oblong, rectangular, square, or triangular shaped.

Figure 6:
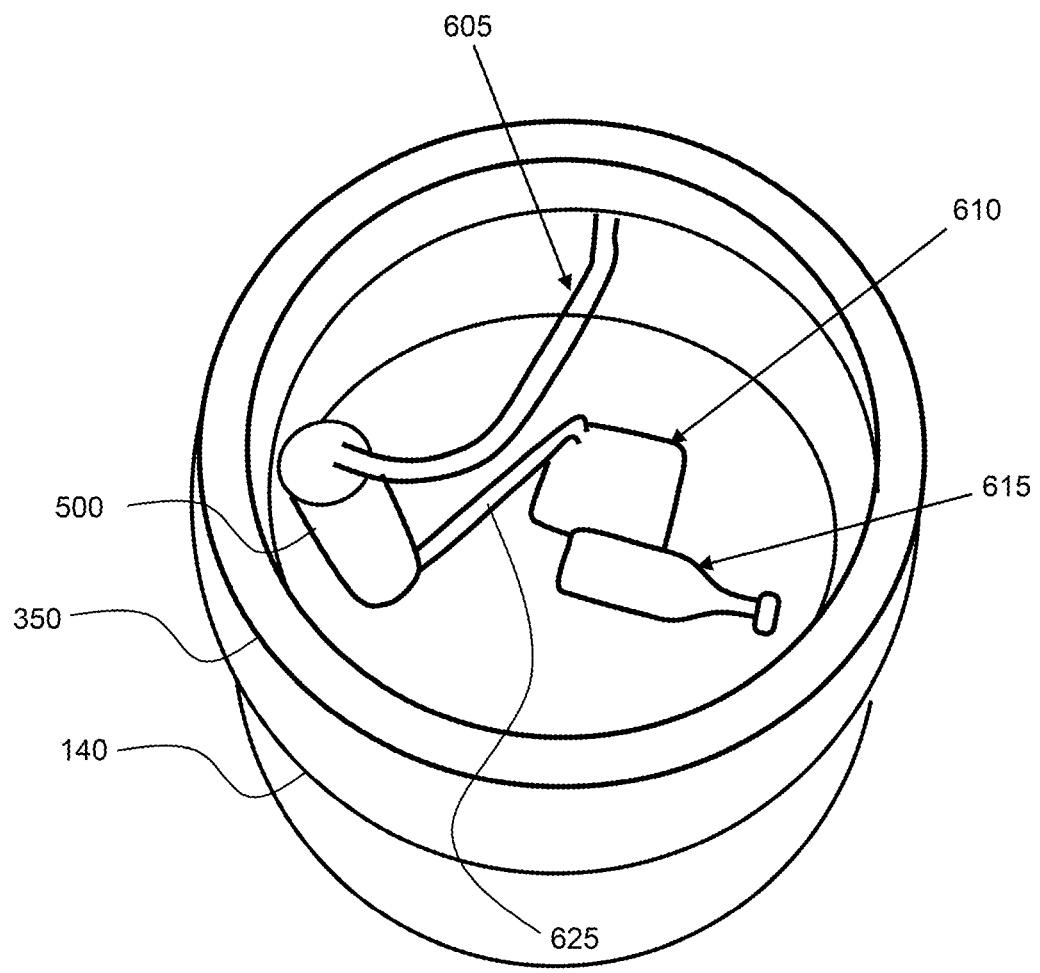
FIG. 6 is an illustration of an exemplary top view of the pet watering system, in accordance with an embodiment of the present invention.

FIG. 6 is an illustration of an exemplary top view of the base portion 140, in accordance with an embodiment of the present invention. In the present embodiment shown, the base portion 140 houses a water filter implement 500, a water pump device 610, a float valve 615, a first water tube 605 configured to connect the water filter implement 500 to the external water flow tube 215, and a second water tube 625 connecting the water pump device 610 to the water filter implement 500. The water pump device 610 may feature an approximate half-horsepower (½ Hp) rating that may produce a flow-rate of approximately one gallon per minute (1 GPM). The water pump device 610 may connect to a bottom plane of the water filter implement 500. The first water tube 605 extends from a top plane of the water filter implement 500 to the faucet implement 120. The water pump device 610 circulates water. The float valve 615 is configured to cease water flow at a certain level. In alternative embodiments, the water filter implement 500 may be removed.

In use, attach the water line connection port 230 of the Pet Watering System 100 to a water line 135, and then allow water to fill the base portion 140. When the water reaches a volume that fully raises the float valve 615, the water flow within the base portion 140 will cease. The user may then plug-in the power cord 130 of the Pet Watering System 100, which will activate the internal water pump device 610, which will begin generation of water flow through the faucet 120 and into the water bowl 115. Animals may then easily access the water from this faucet 120 and bowl 115 for hydration. When the water level in the bowl 115 exceeds the height of the raised drain 405, the water will then return to the base portion 140 for continued use. When the volume of water within the base portion 140 is reduced, by either consumption and/or evaporation, the float valve 615 will lower, thus activating the water line portion 135 to refill the base portion 140.

In an alternative use embodiment, the base portion 140 may be manually filled with water and that same water could circulate through the system 100 until it needs to be refilled. Refilling may be necessitated because the water is consumed by a pet or it evaporates. In this alternative embodiment, the float valve 615 may be eliminated.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing pet watering systems according to the present invention will be apparent to those skilled in the art. Various aspects of the invention have been described above by way of illustration, and the specific embodiments disclosed are not intended to limit the invention to the particular forms disclosed. The particular implementation of the pet watering systems may vary depending upon the particular context or application. By way of example, and not limitation, the pet watering systems described in the foregoing were principally directed to pet support implementations; however, similar techniques may instead be applied to watering systems for human consumption, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising:
    a base portion, wherein said base portion is configured to store water;
    a float valve, wherein said float valve is configured to cease water flow in said base portion when water reaches a predetermined level;
    a water bowl segment that is configured to provide access to water for hydration;
    a faucet implement, wherein said faucet implement directs water to said water bowl segment;
    a water pump device that is configured to direct water stored in said base portion to said faucet implement;
    a bowl bottom lip disposed on a bottom portion of said water bowl segment, wherein said bowl bottom lip is configured to fasten to said base portion;
    a stabilization flange, wherein said stabilization flange is configured to insert into said base portion;
    a water line, wherein said water line is configured to connect a water source to said base portion;
    a water line connection port disposed on a first segment of a sidewall of said base portion, wherein said water line connection port is configured to allow a connection of the water source to said base portion;
    an electrical port that is configured to allow access to a power cord which couples to said water pump device; and
    an external water flow tube that is configured to transfer stored water from said base portion to said faucet implement.

2. The system of claim 1, further comprising an external water flow tube port
    disposed on a second segment of said sidewall of said base portion, wherein said external water flow tube port is configured to allow a connection of said external water flow tube from said base portion to said faucet implement.

3. The system of claim 1, further comprising a faucet holder.

4. A system comprising,
    a base portion, wherein said base portion is configured to store water;
    a float valve, wherein said float valve is configured to cease water flow in said base portion when water reaches a predetermined level;
    a water bowl segment that is configured to provide access to water for hydration;
    a faucet implement, wherein said faucet implement directs water to said water bowl segment;
    a water pump device that is configured to direct water stored in said base portion to said faucet implement;
    a bowl bottom lip disposed on a bottom portion of said water bowl segment, wherein said bowl bottom lip is configured to fasten to said base portion;
    a faucet holder; and
    a bowl rim lining that is configured to, at least one of, protect a rim of said water bowl segment and support said faucet holder.

5. The system of claim 1, in which said water bowl segment comprises a raised drain valve.

6. The system of claim 5, in which said raised drain valve has an aperture that is configured to allow water drainage back to said base portion.

7. The system of claim 1, further comprising a water filter implement that is configured to filter water from said water source that is stored in said base portion.

8. The system of claim 7, in which said water filter implement comprises a filter body.

9. The system of claim 8, in which said water filter implement further comprises a first water tube connection point.

10. The system of claim 9, further comprising a charcoal-based filtration medium disposed within said filter body.

11. The system of claim 10, further comprising a cap implement that is configured to provide a lid for said filter body.

12. The system of claim 11, in which said water filter implement further comprises a second water tube connection point.

13. A system comprising:
    a base portion, wherein said base portion is configured to store water;
    a float valve, wherein said float valve is configured to cease water flow in said base portion when water reaches a predetermined level;
    a water bowl segment that is configured to provide access to water for hydration, in which said water bowl segment comprises a water bowl and a raised drain valve that is configured allow water drainage back to said base portion;
    a faucet implement, wherein said faucet implement directs water to said water bowl segment;
    a water pump device that is configured to direct water stored in said base portion to said faucet implement;
    a bowl bottom lip disposed on a bottom portion of said water bowl segment, wherein said bowl bottom lip is configured to engage said base portion;

a stabilization flange, wherein said stabilization flange is configured to insert into said base portion;

an electrical port that is configured to allow access to a power cord which couples to said water pump device; and an external water flow tube that is configured to transfer stored water from said base portion to said faucet implement.

14. The system of claim 13, further comprising a water filter implement that is configured to filter water from said water source that is stored in said base portion, in which said water filter implement comprises:

a filter body;

a first water tube connection point;

a charcoal based filtration medium disposed within said filter body;

a cap implement that is configured to provide a lid for said filter body; and a second water tube connection point.

* * * * *